(12) United States Patent
Dao

(10) Patent No.: US 10,567,538 B2
(45) Date of Patent: Feb. 18, 2020

(54) DISTRIBUTED HIERARCHICAL CACHE MANAGEMENT SYSTEM AND METHOD

(71) Applicant: Ngoc Dung Dao, Ottawa (CA)

(72) Inventor: Ngoc Dung Dao, Ottawa (CA)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 491 days.

(21) Appl. No.: 15/064,221

(22) Filed: Mar. 8, 2016

(65) Prior Publication Data

US 2017/0264702 A1 Sep. 14, 2017

(51) Int. Cl.
*H04L 29/08* (2006.01)
*H04L 12/879* (2013.01)

(52) U.S. Cl.
CPC ........ *H04L 67/2842* (2013.01); *H04L 49/901* (2013.01); *H04L 67/1097* (2013.01)

(58) Field of Classification Search
CPC .............. G06F 12/0811; G06F 12/084; G06F 12/0866; G06F 2212/312; G06F 3/0683; H04L 67/2842; H04L 49/901; H04L 67/1097; H04L 67/2885; H04L 41/50
USPC ........................................................ 709/217
See application file for complete search history.

(56) References Cited

U.S. PATENT DOCUMENTS

| | | | | |
|---|---|---|---|---|
| 7,281,214 B2* | 10/2007 | Fadell | ................... | G06F 3/0219 345/172 |
| 8,510,785 B2* | 8/2013 | McKinley | .......... | H04N 7/17336 386/294 |
| 2004/0123045 A1 | 6/2004 | Hum | | |
| 2010/0217869 A1* | 8/2010 | Esteban | ............ | G06F 17/30017 709/226 |
| 2015/0201248 A1 | 7/2015 | Joong et al. | | |
| 2017/0171342 A1* | 6/2017 | Wang | ................... | H04L 67/2842 |
| 2017/0257452 A1* | 9/2017 | Hoiles | ................. | H04L 67/2842 |

FOREIGN PATENT DOCUMENTS

| CN | 104219117 A | 12/2014 |
|---|---|---|
| CN | 104967685 A | 10/2015 |

OTHER PUBLICATIONS

Huang Q. et al., An Analysis of Facebook Photo Caching. SOSP'13, Nov. 3-6, 2013. Farmington, Pennsylvania, U.S.A.
International Search Report dated Nov. 28, 2016 for International Patent Application No. PCT/CN2016/081744 filed May 11, 2016.
English translation of Chinese Patent Application No. CN104219117A.
English translation of Chinese Patent Application No. CN104967685A.

* cited by examiner

*Primary Examiner* — Davoud A Zand

(57) ABSTRACT

A method for managing a cache memory network according to a distributed hierarchical cache model is disclosed. The distributed hierarchical cache model includes a plurality of cache levels each corresponding to a delivery rank for delivering data content to users of the cache memory network. The method includes dividing at least one cache memory of the cache memory network into a plurality of cache segments, mapping each of the cache segments to a cache level of the distributed hierarchical cache model, and performing cache management operations over the cache memory network according to the distributed hierarchical cache model.

21 Claims, 11 Drawing Sheets

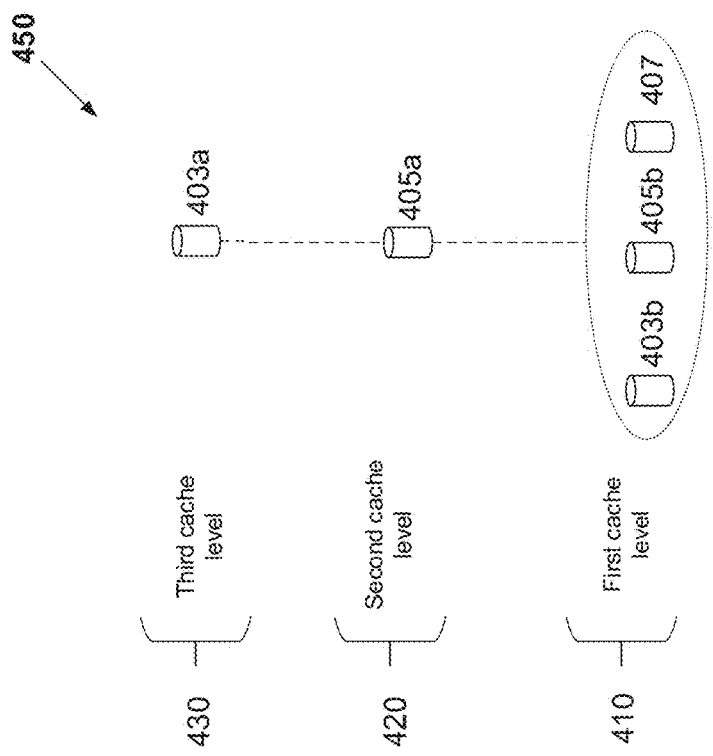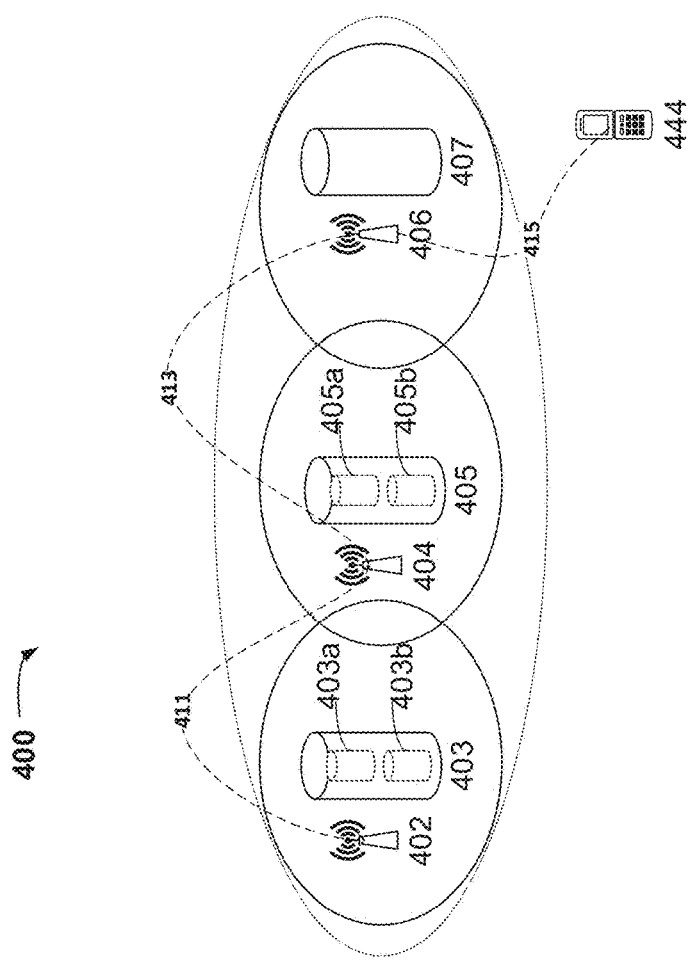

DISTRIBUTED HIERARCHICAL CACHE MANAGEMENT SYSTEM AND METHOD

CROSS-REFERENCE TO RELATED APPLICATIONS

This application is related to U.S. application Ser. No. 14/967,807, filed on Dec. 14, 2015, and titled "Method and Apparatus for Data Caching in a Communications Network", the entire disclosure of which is hereby incorporated by reference.

FIELD OF THE INVENTION

The present invention pertains to the field of network communications, and in particular to a distributed hierarchical cache management system and method.

BACKGROUND

Network caching generally refers to the storage of commonly accessed data content such as web pages, audio/video files, and images within a communications network. For example, when a user requests a specific piece of data content, it may be retrieved from an originating content providing server, and delivered to the user via the communications network. In some situations, the piece of data content may also be stored within a cache memory (e.g. "cached") of the communications network; this allows for its subsequent retrieval from the cache memory instead of from the originating server, in the event of a future request for the same data content. Accordingly, 'caching' certain pieces of data content may provide faster delivery and reduce data traffic within the communications network. However, some communications networks have a complex or irregular topology, which makes it difficult to decide where and how to cache specific data content for improved network efficiency.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an improved system and method for performing cache management operations on a cache network, based on a distributed hierarchical cache model.

In accordance with embodiments of the present invention, there is provided a method for managing a cache memory network according to a distributed hierarchical cache model comprising a plurality of cache levels. The method comprising: dividing at least one cache memory of the cache memory network into a plurality of cache segments; mapping each of the cache segments to a cache level of the distributed hierarchical cache model, each of the cache levels corresponding to a delivery rank for delivering data content to users of the cache memory network; and performing cache management operations over the cache memory network according to the distributed hierarchical cache model.

In accordance with embodiments of the present invention, there is provided a management module for managing a cache memory network according to a distributed hierarchical cache model having a plurality of cache levels. The management module comprising: a processor; and a memory communicatively coupled to the processor and having stored thereon machine readable code which when executed by the processor causes the management module to: divide at least one cache memory of the cache memory network into a plurality of cache segments; map each of the cache segments to a cache level of the distributed hierarchical cache model, wherein each of the cache levels correspond to a delay constraint for delivering data content to users of the cache memory network; and perform cache management operations over the cache memory network according to the distributed hierarchical cache model.

In accordance with embodiments of the present invention, there is provided a cache memory network comprising: a plurality of cache memories; and a management module communicatively coupled to the plurality of cache memories, the management module operatively configured to: divide at least one cache memory into a plurality of cache segments; map each of the cache segments to a cache level of a distributed hierarchical cache model, wherein each of the cache levels correspond to a delay constraint for delivering data content to users of the cache memory network; and perform cache management operations over the plurality of cache memories according to the distributed hierarchical cache model.

BRIEF DESCRIPTION OF THE FIGURES

Further features and advantages of the present invention will become apparent from the following detailed description, taken in combination with the appended drawings, in which:

FIG. 4A illustrates a cache memory network, according to an embodiment;

FIG. 4B illustrates a distributed hierarchical cache model corresponding to the cache memory network of FIG. 4A, according to an embodiment;

It will be noted that throughout the appended drawings, like features are identified by like reference numerals.

DETAILED DESCRIPTION

Communications networks typically include a plurality of servers and nodes that are communicatively interconnected to serve the requests of various users connected to the network via user equipment (UEs). One or more cache memories may be deployed at various locations or nodes of the communications network in order to temporarily and locally store frequently accessed data content (i.e. "caching"), which may then be re-used in a subsequent request without requiring retransmission from the original source location. Efficient caching of frequently accessed data content may improve the "cache hit" ratio, which is the probability of a user requested piece of data content located within cache memory of the communications network, thus ensuring faster retrieval of the requested data content to the user. A "cache miss" is the absence of a requested piece of data content within the communications network, which must then be retrieved from an originating content provider in order to fulfil the request.

When caching frequently accessed data content, the decision of where to cache a piece of data content within a communications network is also a relevant factor for ensuring efficient network caching operations. For example, caching a piece of data content in a geographical location closer to an expected user (or group of expected users) reduces the distance and latency time (i.e. delay) for delivering the data content to the expected user (e.g. for content retrieval). Some other benefits of efficient caching include the reduction of bandwidth consumption over the communications network, and request processing over the network.

Figure 1:
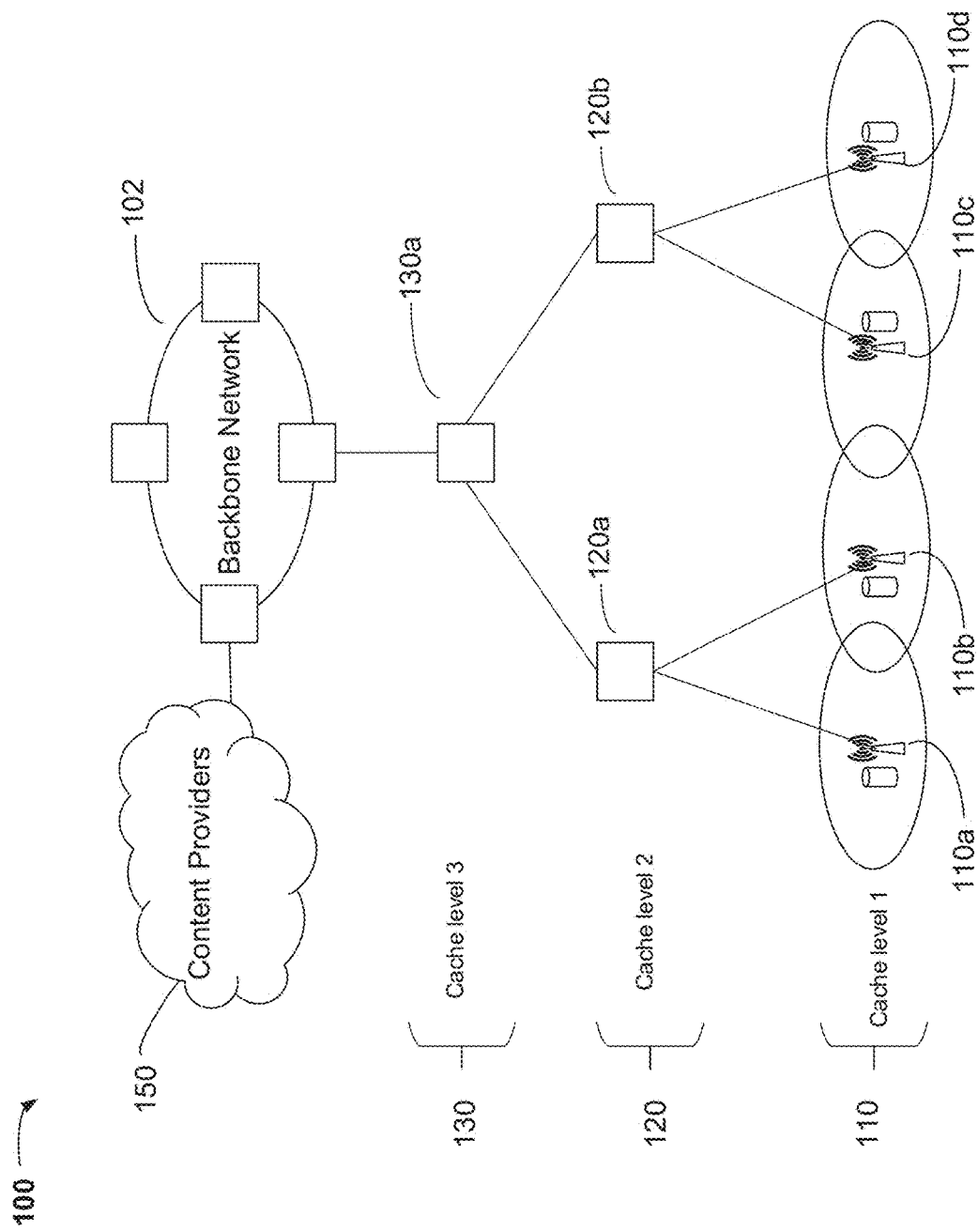
FIG. 1 illustrates a communications network having a topological tree structure, according to an embodiment.

Referring to FIG. 1, there is shown a communications network 100 with a topological tree structure, according to an embodiment. The communications network 100 comprises a backbone network 102, a first node 130a coupled to the backbone network 102, second and third nodes 120a, 120b coupled to the first node 130a, and a plurality of access nodes 110a-110d coupled to the second and third nodes 120a, 120b as shown. Nodes 130a, 120a, 120b may include routers having individual cache memories associated therewith, while access nodes 110a-110d may be Radio Access Nodes (RAN), base stations, eNodeB's, Wi-Fi access points, transceivers or antennas, also having individual cache memories. One or more UEs (not shown) may be communicatively coupled to any of the access nodes 110a-110d in order to transmit or receive data content from the communications network 100, for example via a wireless interface. The data content may be retrieved from Content Providers 150, or if cached within communications network 100, from a cache memory location associated with nodes 130a, 120a, 120b or access nodes 110a-110d. In some embodiments, communications network 100 may further include a management module (not shown), such as a Caching, Computing and Forwarding Manager (CCFM) in order to receive and manage UE requests for data content, and for also determining and managing caching of data content within communications network 100 nodes.

As highlighted above, communications network 100 comprises a topological tree structure, which permits clear organization of individual cache memories in nodes 130a, 120a, 120b, 110a, 110b, 110c, 110d, into distinct hierarchical cache levels that are each capable of meeting a specific delay constraint. Still referring to FIG. 1, the first cache level 110 includes the cache memories of access nodes 110a-110d, while the second cache level 120 includes the cache memories of nodes 120a and 120b, while the third cache level 130 includes the cache memory of node 130a. Therefore, if a UE is associated with access node 110a for example, delivery of data content from the first cache level 110 (via cache memory in node 110a) would likely have the shortest delay (of 1 hop minimum), delivery of data content from the second cache level 120 (via cache memory in node 120a) would likely have a moderate delay (of 2 hops minimum), and delivery of data content from the third cache level 130 (via cache memory in node 130a) would probably have the longest delay (of 3 hops minimum). Accordingly, the segregation of cache memories from a hierarchical infrastructure into hierarchical cache levels 110, 120, 130 can be used as a basis for the caching of data content to meet specific delay constraints.

Moreover, segregation of cache memories into cache levels of a hierarchical cache model, also allows for data content to be organized according to some criteria that improves cache management efficiency. For example, data content that is consistently requested by UEs connected to access node 110a, can be cached in the first cache level 110 (at access node 110a) to reduce distance and latency times for retrieving the data content to requesting users. Data content that is sometimes requested, can be cached at the second cache level 120 (at node 120a for example), and data content that is rarely requested can be cached at the third cache level 130 (at node 130a). In this way, data content can be cached in a logically organized manner throughout communications network 100 in a way that reduces network bandwidth and overall latency times, while improving network caching efficiency.

Figure 2:
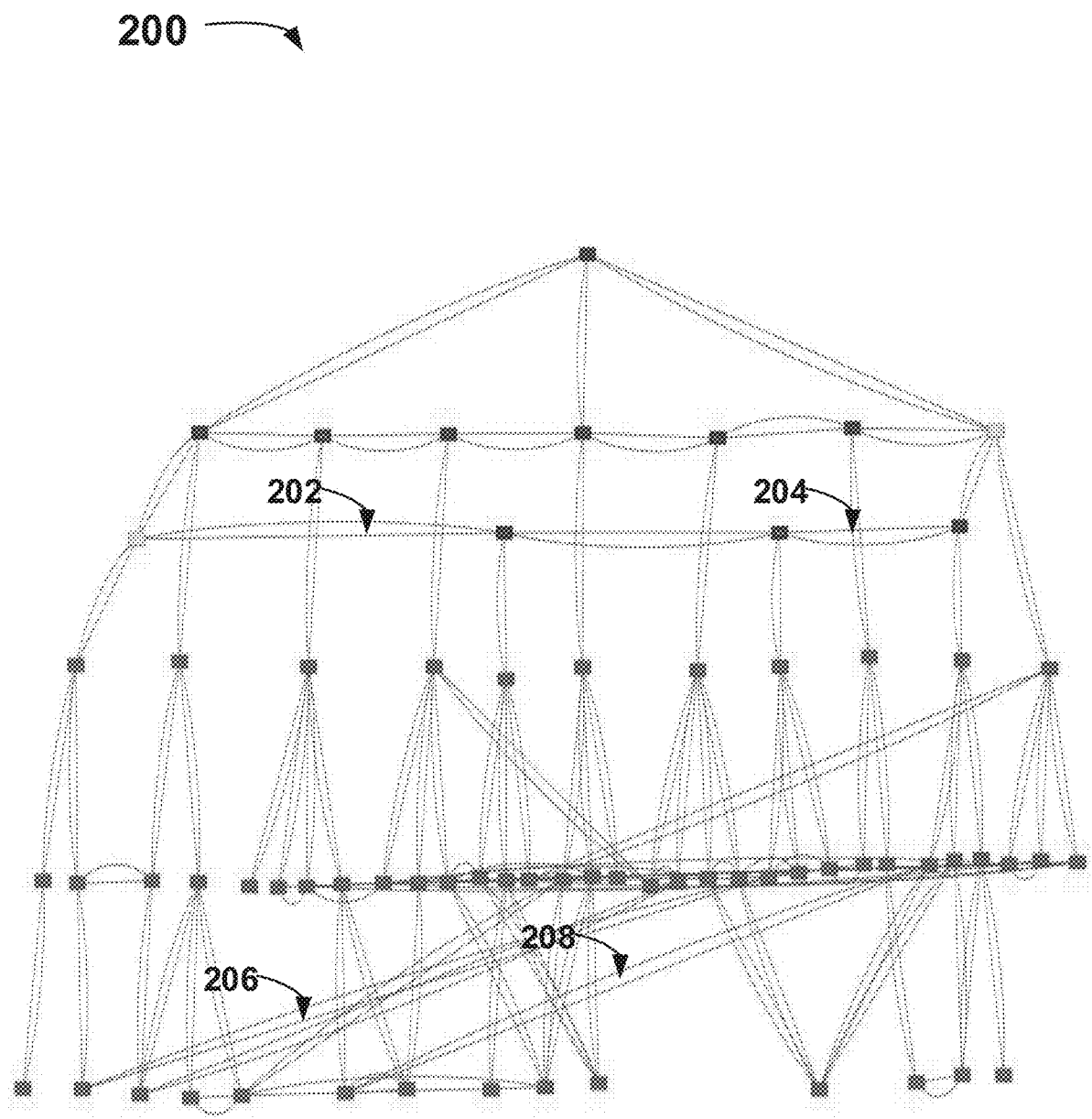
FIG. 2 illustrates a communications network having a topological meshed structure, according to an embodiment.

Unfortunately, some communication networks have complex or irregular topologies which make it difficult to organize cached data content into a logical hierarchical structure. This problem is exacerbated as the size of the communications network and the number of files (i.e. pieces of data content) which also need to be cached, increases. Referring to FIG. 2, there is shown a communications network 200 comprising a topological meshed structure. The communications network 200 includes a number of horizontal 202, 204 and diagonal 206, 208 "cross-node" links, in contrast to the communications network 100 which comprises only vertical links between cache levels 110, 120, 130. The presence of horizontal and diagonal topological links provides a number of competing choices when determining the appropriate cache location to cache a particular piece of data content. Further, it is difficult to ascertain distinct cache levels, which can be used as a basis for determining cache locations for data (for example, based on popularity, usage frequency, least recently used, etc.). Accordingly, embodiments of the present invention are directed towards a system and method for performing cache management operations on a cache memory network, based on a distributed hierarchical cache model. This allows for flexible organization of a cache memory network into a hierarchical cache model to improve cache management efficiency.

Figure 3A:
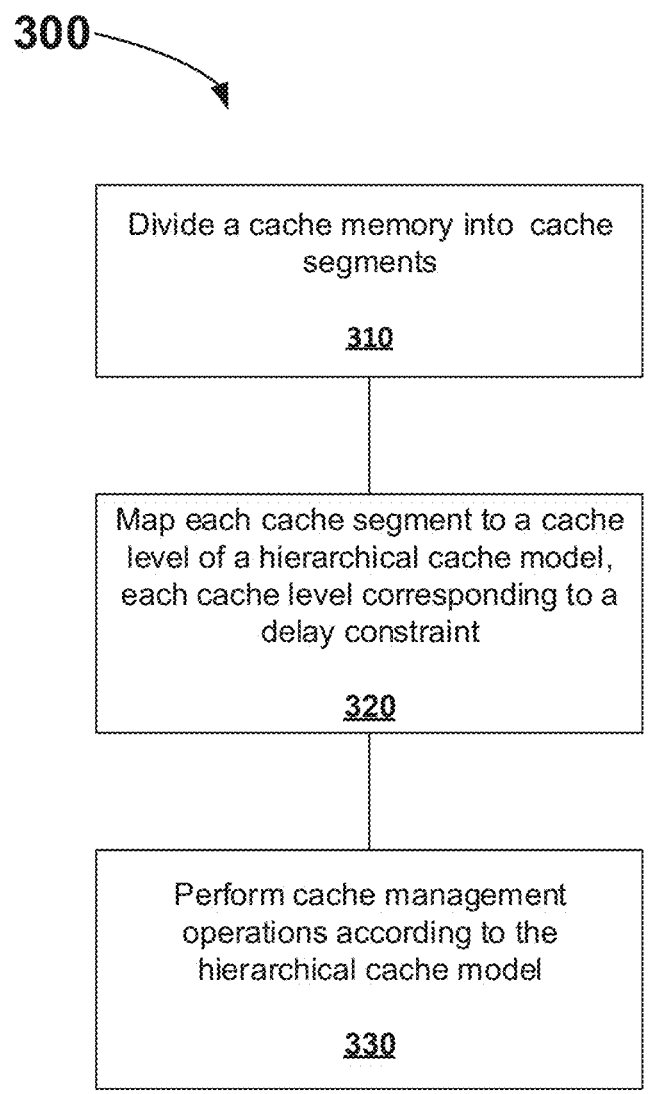
FIG. 3A is a flow chart illustrating a method for managing a cache memory network according to a distributed hierarchical cache model, according to an embodiment.

Referring to FIG. 3A, there is shown a method 300 for managing a cache memory network, according to an embodiment. As will be discussed in further detail below, the method includes organizing a cache memory network into a distributed hierarchical cache model having distinct cache levels, and performing cache management operations on the cache memory network based on the distributed hierarchical cache model. At step 310, one or more cache memories of a cache memory network are divided into a plurality of cache segments (as shown in FIG. 4A for example, cache memory 403 is divided into cache segments 403a and 403b). At step 320, each cache segment is mapped to a cache level of a distributed hierarchical cache model (as shown in FIGS. 4A-4B for example, cache segment 403a is mapped to the third cache level 430, and cache segment 403b is mapped to the first cache level 410 of hierarchical cache model 450), wherein each cache level corresponds to a certain delivery rank for delivering data content to users of the cache memory network. For example, first cache level 410 may be used for mapping cache segments having the shortest delivery time, while the third cache level 430 may be used for mapping cache segments having the longest delivery time. At step 330, cache management operations are performed over the cache memory network according to the distributed hierarchical cache model. This may include various caching operations involving the storage and movement of data content according to the distributed hierarchical cache model, or retrieval operations for delivering requested data content according to the distributed hierarchical cache model.

In some embodiments (not shown), step 330 may comprise dividing a piece of data content into a plurality of portions, and storing a first portion in a cache segment associated with a first cache level, and storing a second portion in a cache segment associated with a second cache level. For example, in the case of video streaming, this will allow the first portion of a video to be streamed more quickly to reduce initial buffering time, while the second portion may be concurrently retrieved. Further examples of cache management operations are discussed below.

The delivery rank (in step 320) may comprise one of multiple criteria suitable to discriminate the delivery quality of data content to users of the cache memory network. For example, the delivery rank may include: delay constraint ranking, quality of service ranking, quality of experience ranking, a distance ranking, and the like. For example, when the delivery rank comprises a delay constraint ranking, the first cache level may correspond to cache segments/memories that provide the fastest delivery times to users, while the second cache level may correspond to cache segments/memories which provide relatively longer delivery times. As another example, when the delivery rank comprises a distance ranking, the first cache level may correspond to cache segments/memories that are physically closest to users, and the second cache level may correspond to cache segments/memories that are physically further to users (thus likely to require a longer delivery time).

In certain embodiments, steps 310-330 may be carried out by a management module communicatively coupled to the individual cache memories of the cache memory network. The management module may conceptually divide cache memories into cache segments, and assign the cache segments to a distributed hierarchical cache model stored within an internal memory or database. Subsequent cache management operations can be carried out by the management module with reference to the distributed hierarchical cache model. For example, the database may store a list of data content associated with the distributed hierarchical cache model, including a library of its cache levels and data content mapped to each cache level, as well as the location of the data content within cache segments or memories of the cache memory network. In some embodiments, the management module may perform step 330 (cache management operations) under a cooperative or peer-to-peer type relationship with cache memories, or set predefined rules for the cache memories to assist in cache management.

Figure 3B:
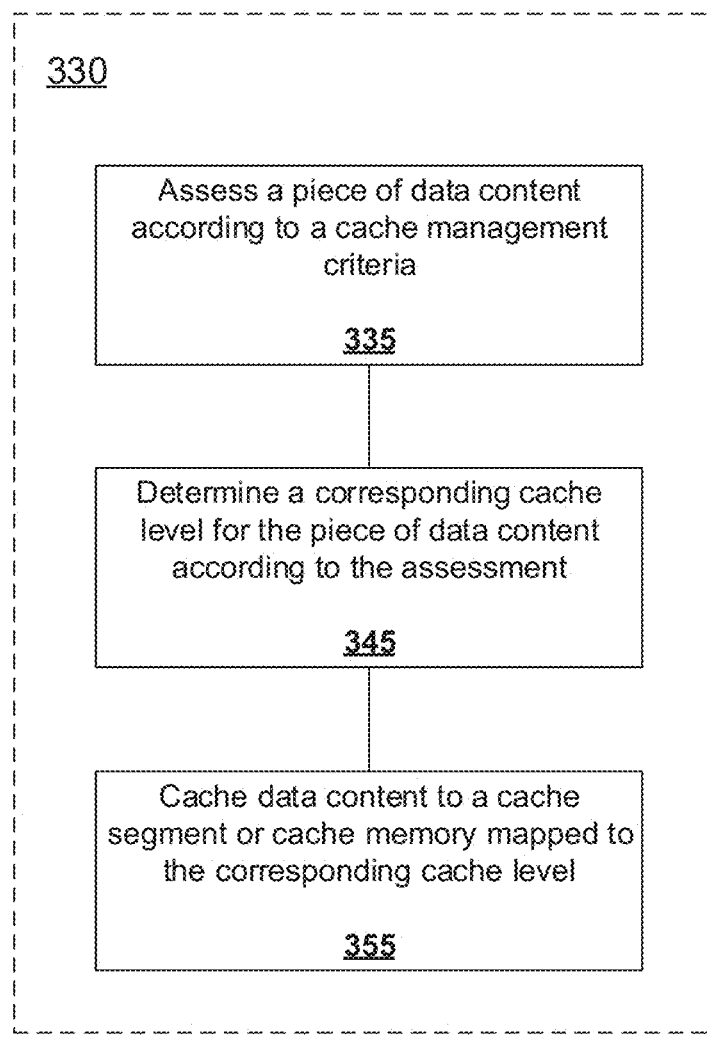
FIG. 3B is a flow chart illustrating cache management operations including the storage of data content according to a distributed hierarchical cache model, according to an embodiment.
Figure 6:
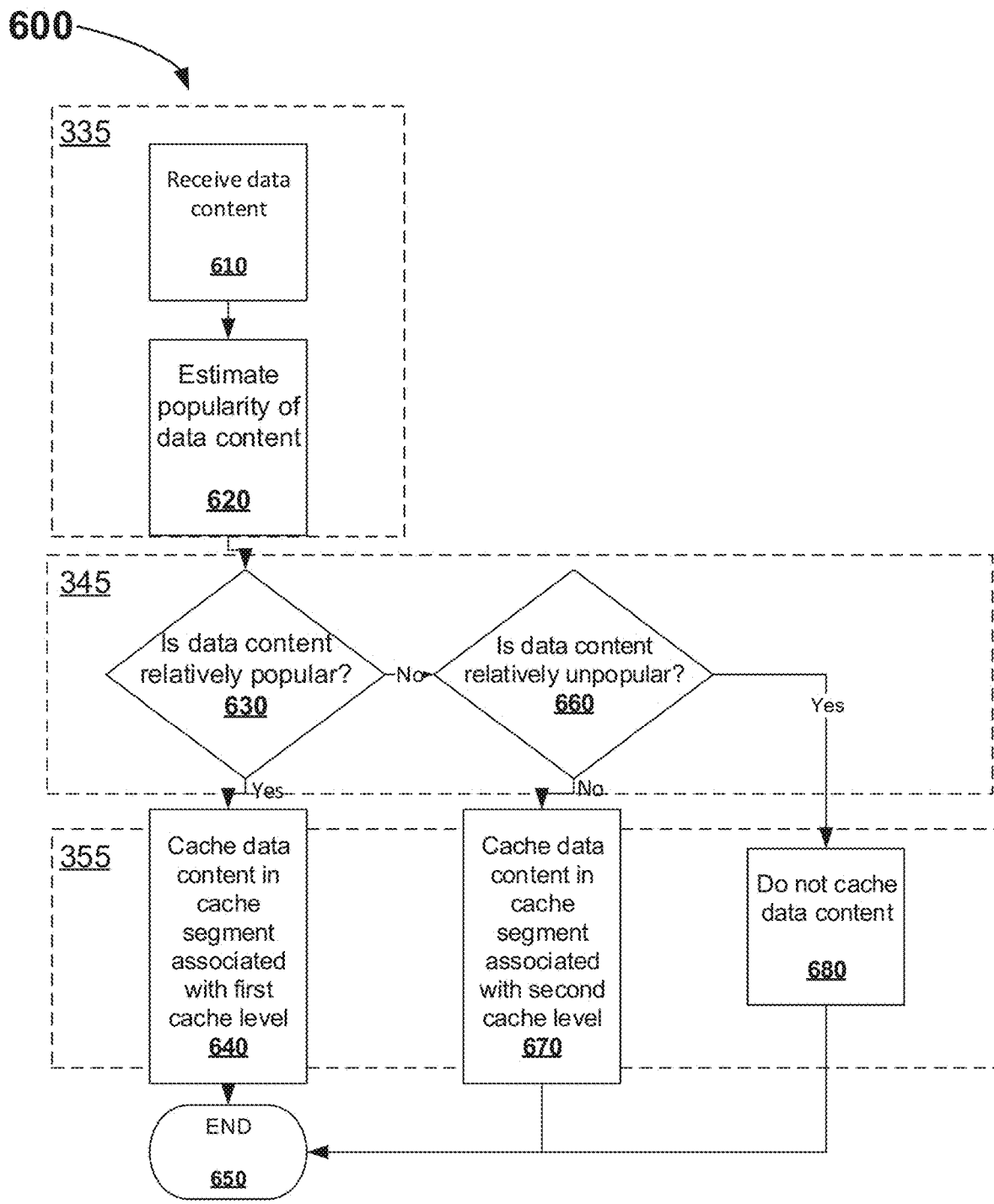
FIG. 6 is a flow chart illustrating cache management operations including the storage of data content according to a distributed hierarchical cache model, according to an embodiment.

Referring to FIG. 3B, there is shown an embodiment of cache management operations comprising storing data content according to a distributed hierarchical cache model, which in some embodiments may also comprise the step of performing cache management operations 330 of method 300. At step 335, a piece of data content is assessed according to a cache management criteria. As will be discussed in further detail below, the cache management criteria may include: content popularity, importance, priority level, least recently used, data content size, Quality of Service (QoS) requirement, delivery speed/time, delay requirements, contractual service level agreement criteria, and so forth. The assessment of the data content may provide various results or ranges. For example, when the cache management criteria is "popularity" of data content, the assessment may include "very popular", "moderately popular", or "unpopular". When the cache management criteria is "minimum packet delay", the assessment may include "1 hop", "2 hops", or "3 hops", for example. The piece of data content that is assessed may be referenced from a user request, or be stored within the cache memory network. Next, at step 345, the corresponding cache level is determined for the piece of data content according to the assessment in step 335. For example, when the cache management criteria is "popularity", data content assessed as "very popular" may correspond to the first cache level 410 which is closest to potential users, data content assessed as "moderately popular" may correspond to the second cache level 420 which is slightly farther from potential users, and data content assessed as "unpopular" may correspond to the third cache level 430 which is farthest from potential users and unlikely to be requested. Finally, at step 355, the piece of data content is cached into a cache segment or cache memory mapped to the corresponding cache level. Another example of this embodiment is illustrated in FIG. 6, which will be discussed in further detail below.

In certain embodiments, the step of performing cache management operations 330 can be carried out in a cooperative/distributed manner between a management module and various cache memories. For example, the management module can assign a threshold or predefined rules for each cache memory to automatically manage its own data content, and provide various reports or updates to the management module. In one embodiment, the first cache level is reserved for higher priority data content, allowing for storage in a limited timeline of 2 days. After two days, it's data content will be automatically removed. In another embodiment, least recently used data content will be automatically removed if the cache memory reaches its maximum caching capacity. These examples illustrate how individual cache memories can manage their own data content under predefined rules from the management module.

Figure 3C:
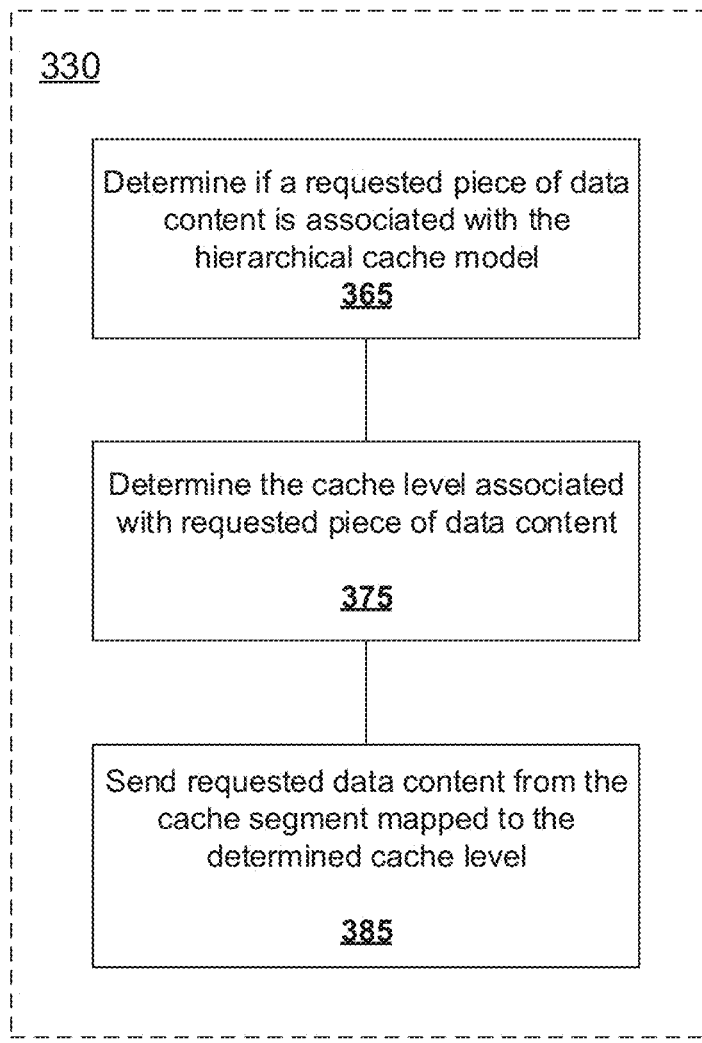
FIG. 3C is a flow chart illustrating cache management operations including the retrieval of data content according to a distributed hierarchical cache model, according to an embodiment.
Figure 7:
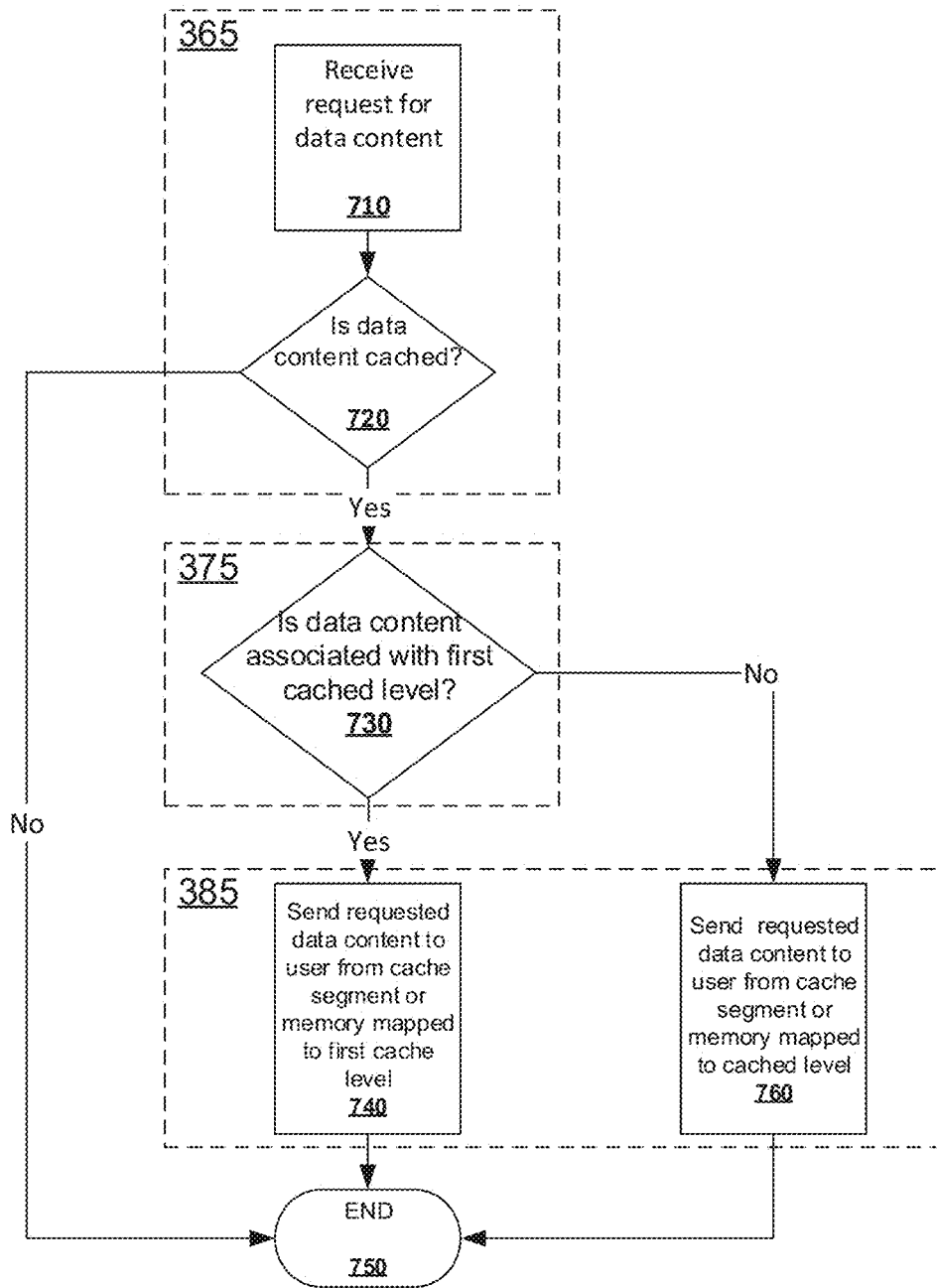
FIG. 7 is a flow chart illustrating a cache management operations including the retrieval of data content according to a distributed hierarchical cache model, according to an embodiment.

Referring to FIG. 3C, there is shown an embodiment of cache management operations comprising retrieval of data content associated with a distributed hierarchical cache model, which may in some embodiments, comprise the step of performing cache management operations 330 of method 300. At step 365, a determination is made as to whether a requested piece of data content is associated with the distributed hierarchical cache model, for example, by comparing the requested piece of data content to other data content associated or mapped to the distributed hierarchical cache model. At step 375, if the requested piece of data content is associated with the distributed hierarchical cache model, then the cache level associated with the requested piece of data content is determined. Finally, at step 385, the requested data content is sent to the user from the cache segment (or memory) mapped to the determined cache level in step 375 above. Another example of this embodiment is illustrated in FIG. 7, which will be discussed in further detail below.

As will be further illustrated in the accompanying examples, organizing a cache memory network into a distributed hierarchical cache model having distinct cache levels, and performing cache management operations based on the distributed hierarchical cache model, can improve network caching efficiency by reducing network bandwidth and overall latency times associated with delivering requested data content.

Referring to FIGS. 4A-4B, there is shown an embodiment of a cache memory network 400 and corresponding distributed hierarchical cache model 450, used to illustrate steps 310 to 320 of method 300 in FIG. 3A above. Cache memory network 400 has a flat (non-hierarchical) model, and includes a first access node 402 with a first cache memory 403, a second access node 404 with a second cache memory 405, and third access node 406 with a third cache memory 407. Access nodes 402, 404, 406 are communicatively inter-coupled via links 411, 413 (which may be wired and/or wireless) to permit the mutual exchange of data content. Applying method 300 to cache memory network 400 of FIG. 4A, at step 310, first cache memory 403 is divided into cache segments 403a, 403b, and second cache memory 405 is divided into cache segments 405a, 405b (third cache memory 407 is not divided in this example). Now referring to FIG. 4B, at step 320, cache segments are now mapped to cache levels 410, 420, 430 of the distributed hierarchical cache model 450, where each cache level corresponds to a delivery rank. Namely, cache segment 403a is mapped to third cache level 430, cache segment 405a is mapped to second cache level 420, and cache segments 403b, 405b and third cache 407, are all mapped to first cache level 410.

In this embodiment, the delivery rank for each cache level 410, 420, 430 is a delay constraint rank determined according to the physical topology of the cache memory network 400 in relation to a potential user. For example, a UE 444 coupled to access node 406 would receive data content mapped to first cache level 410 (e.g. when physically stored cache memory 407) within a single hop (via link 415), receive data content mapped to second cache level 420 (i.e. physically stored in cache segment 405a) within 2 hops (via links 413 and 415), and receive data content mapped to third level cache 430 (i.e. physically stored in cache segment 403a) within 3 hops (via links 411, 413, 415). In this way, data content (during subsequent steps 330-350 for example) can be mapped to one of cache levels 410, 420, 430 (and cached in a corresponding physical cache location of cache network 400) according to a specific cache management criteria in a way that can efficiently leverage the minimum delay constraints associated with each cache level.

Figure 5B:
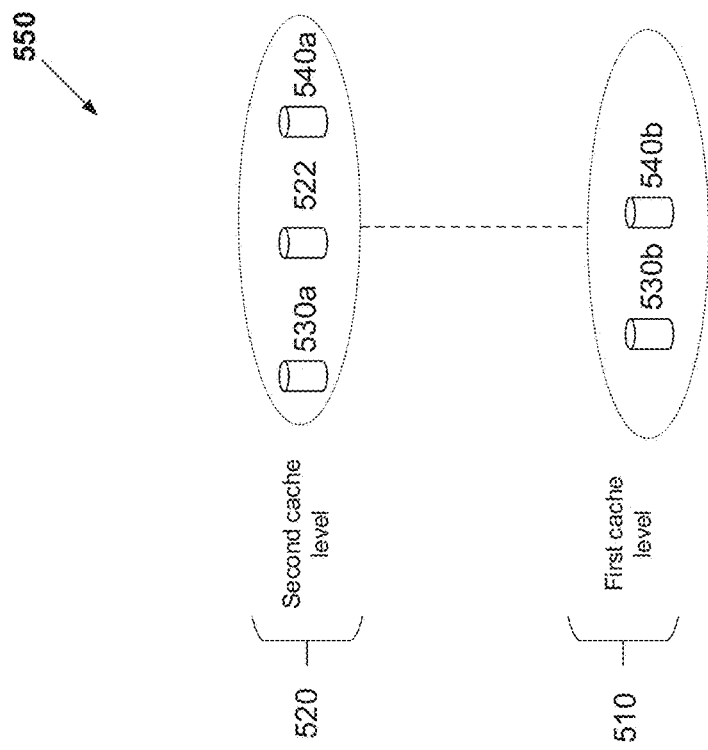
FIG. 5B illustrates a distributed hierarchical cache model corresponding to the cache memory network of FIG. 5A, according to an embodiment.
Figure 5A:
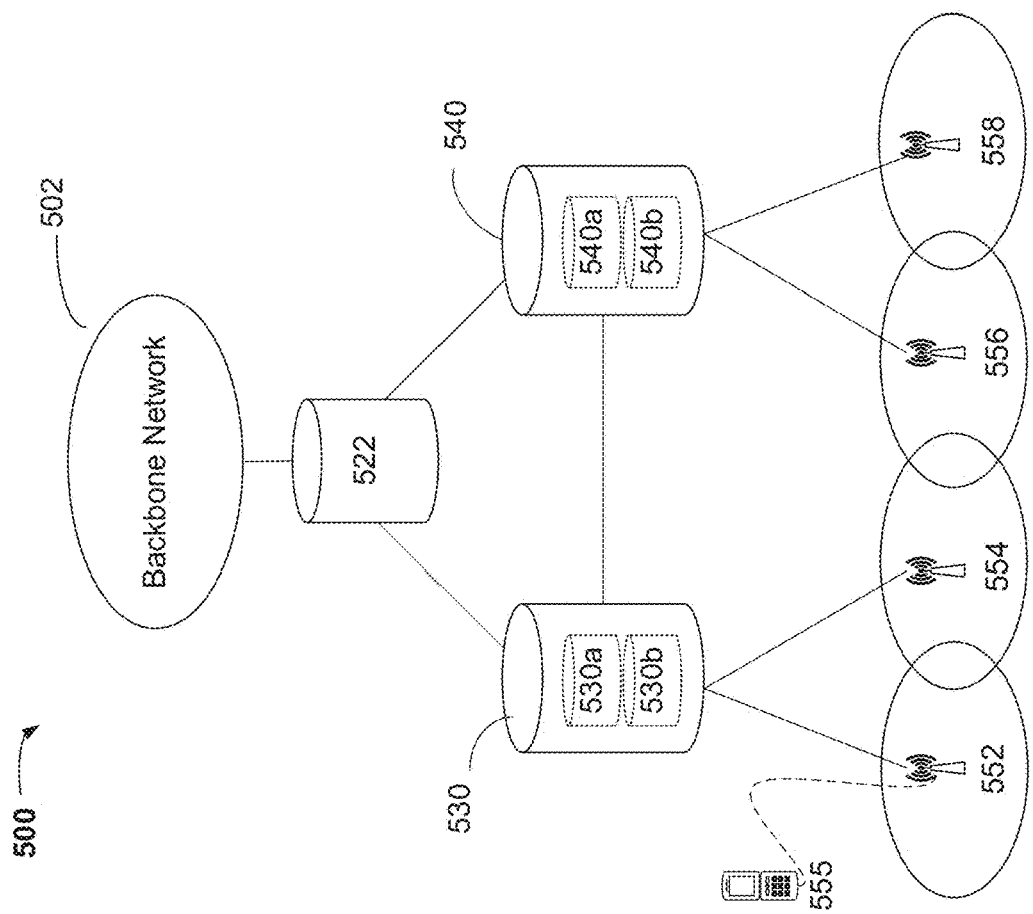
FIG. 5A illustrates a cache memory network, according to an embodiment.

Referring to FIGS. 5A-5B, there is shown another embodiment of a cache memory network 500 and corresponding distributed hierarchical cache model 550, used to further illustrate steps 310 to 320 of method 300 in FIG. 3A above. Cache memory network 500 has a meshed structure, and includes a backbone network 502, a first cache memory 522, a second cache memory 530, and a third cache memory 540 communicatively inter-coupled as shown. Access nodes 552, 554 are coupled to second cache memory 530, while access nodes 556, 558 are coupled to third cache memory 540. However, access nodes 552, 554, 556, 558 do not include any locally deployed cache memories in this embodiment.

Applying method 300 to cache memory network 500 of FIG. 5A, at step 310, second cache memory 530 is divided into cache segments 530a, 530b, while third cache memory 540 is divided into cache segments 540a, 540b (first cache memory 522 is not divided in this example). Now referring to FIG. 5B, at step 320, cache segments are now mapped to cache levels 510, 520 of the distributed hierarchical cache model 550, where each cache level corresponds to a certain delivery rank. In this embodiment, the delivery rank is a delay constraint rank, and cache segments 530b, 540b are mapped to first cache level 510, and cache segments 530a, 540a and cache memory 522 are mapped to second cache level 520. For example, UE 555 coupled to access node 552 may receive data content mapped to the first cache level 510 (i.e. stored in cache segment 530b) within 2 hops, while it may receive data content mapped to the second cache level 520 (i.e. stored in any of cache segments 530a, 540a, or cache memory 522) within 3 hops, dependent on the specific storage location and routing. Accordingly, the first cache level 510 may be reserved for mapping data content having a higher delivery rank (i.e. higher quality/service/speed of delivery), while the second cache level 520 can be reserved for mapping data content with more flexible delivery requirements. As will be seen in the following examples, the delivery rank associated with each cache level can be leveraged according to a cache management criteria (such as data content popularity, size, least recently used, etc.) in order to improve caching efficiency.

Referring to FIG. 6, there is shown a flow chart 600 of an embodiment of cache management operations comprising storage of data content into a cache memory network according to a distributed hierarchical cache model having two cache levels, which may also comprise the step of performing cache management operations 330 of method 300 in FIG. 3A, and/or correspond to the step of assessing a piece of data content 335, determining a corresponding cache level 345, and caching data content to a cache segment or memory mapped to the corresponding cache level 355 in FIG. 3B. At step 610, a piece of data content is received, for example, by a management module (not shown) of a cache memory network from a content provider. At step 620, the popularity of the piece of data content is estimated, for example, according to a data content popularity estimation algorithm. At step 630, a determination is made as to whether the piece of data content is considered relatively popular. If yes, then at step 640, the piece of data content is cached in a cache segment associated with a first cache level of a distributed hierarchical cache model. If at step 630, the piece of data content is not considered relatively popular, then at step 660, a determination is made as to whether the piece of data content is considered relatively unpopular. If no, then at step 670, the piece of data content is cached in a cache segment associated with a second cache level of a distributed hierarchical cache model. If yes, then at step 680, the piece of data content is not cached in the cache memory network. In this way, the most popular pieces of data content may be stored in cache segments or memories associated with the first cache level which provide lower latency times, moderately popular pieces of data content may be stored in cache segments or memories associated with the second cache level which provide slightly longer latency times, and unpopular data content is not stored at all within the cache memory network. Since popular pieces of data content are most likely to be subsequently requested, and unpopular pieces of data content are unlikely to be requested, overall network efficiency is improved as popular pieces of data content are stored in cache segments associated with cache levels that provide lower latency times for delivery to potential users. This reduces the overall network latency the network experiences in delivering popular data content to various users.

Additional benefits of the cache management operations shown above in FIG. 6 include: an improved cache hit ratio and decreased cache miss ratio (as relatively popular data content are stored in the cache memory network, and unpopular data content are omitted), a reduction in overall packet delay times, flexibility in the storage of less popular/delay-tolerant data content, improved memory allocation by aggregating under-utilized cache segments into cache levels, traffic off-loading from large memories (e.g. from a packet gateway) to various cache segments. In other embodiments (not shown), an alternative cache management criteria may be used instead of data content 'popularity', as illustrated in the above examples.

Referring to FIG. 7, there is shown a flow chart 700 of an embodiment of cache management operations comprising retrieving a piece of data content from a cache memory network according to a distributed hierarchical cache model having two cache levels, which may also comprise the step of performing cache management operations 330 of method 300 in FIG. 3A, and/or correspond to the step of determining if a requested piece of data content is associated with the hierarchical cache model 365, determining the cache level associated with the requested piece of data content 375, sending requested data content from the cache segment mapped to the determined cache level 385 in FIG. 3C. At step 710, a request for a piece of data content is received, for example, from a user associated with an access node of the cache memory network. At step 720, a determination is made as to whether the requested piece of data content is cached within the cache memory network (i.e. associated with the distributed hierarchical cache model). If no, the operation ends at step 750. If yes, then at step 730, a determination is made as to whether the requested piece of data content is associated with the first cache level (i.e. cached in a corresponding cache segment or cache memory). If yes, then at step 740, the requested data content is sent to the user from the cache segment or memory mapped to the first cache level, which contains the requested data content. If however at step 730 the data content is not associated with the first cache level, it is by default associated with the second cache level, and at step 760 the requested data content is sent to the user from the cache segment or memory mapped to the second cache level, which contains the requested data content. In this way, requested data content can be retrieved and delivered to users from various cache (segment) locations throughout the cache memory network, according to its association with the distributed hierarchical cache model.

In certain embodiments, step 720 may be performed through comparing the requested piece of data content against a database (for example, within a management module or CCFM) listing all data content associated with the distributed hierarchical cache model. The database may also contain libraries (or categories) for each cache level listing the pieces of data content mapped to each cache level. For example, step 730 may be performed by comparing the requested piece of data content each library to determine which cache level the requested piece of data content is mapped to.

Referring to FIGS. 8A-D, there are shown graphs comparing the results of various simulations performed over cache memory network 200 of FIG. 2, according to an embodiment. In this simulation, 10,000 pieces of data content each having the same size, are cached upon a user request into memory network 200 using 1) Least Recently Used (LRU) method, 2) 4-Segmented LRU (S4LRU) method, and 3) the cache management method 300 of FIG. 3A. The simulation parameters include each cache memory having a 1000 file storage capacity, and 100 users disbursed amongst 57 cells, over 59,000 user requests being made. For cache management method 3) above, the simulation parameters further include: the distributed hierarchical cache model having two cache levels, where the first level has a 5 hop limit delay constraint, and the second level has a greater than 5 hop delay constraint; caching the top 5% most popular data content in cache segments mapped to the first cache level, and remaining data content in cache segments mapped to the second cache level; a 10% estimation error for less popular data content; an omission of data content (not caching) considered least popular. The horizontal axis "Number of Caches" in these graphs indicate the number of individual cache memories used in each simulation for the memory network 200 of FIG. 2, and each cache memory is divided into two segments.

Figure 8B:
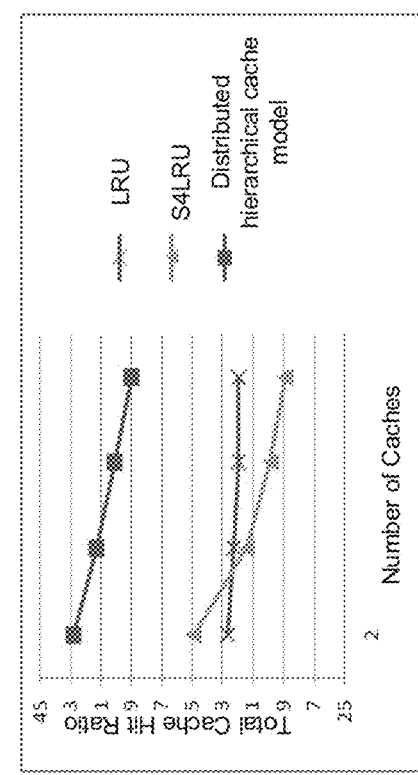
FIGS. 8A-8D are graphs illustrating the results of simulations performed over the communications network of FIG. 2, according to an embodiment.
Figure 8D:
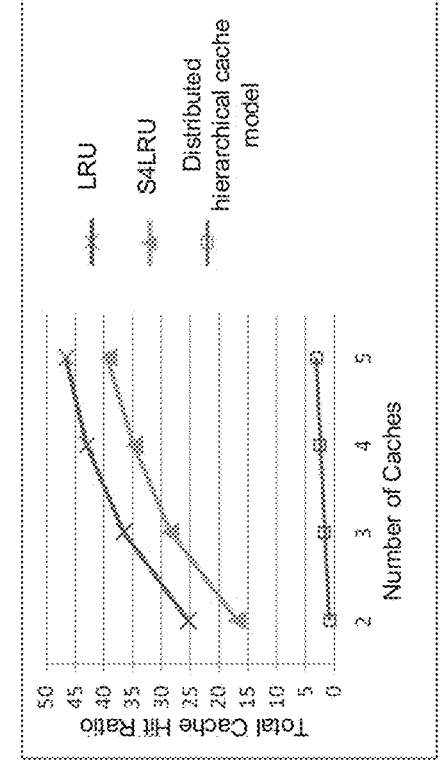
Figure 8A:
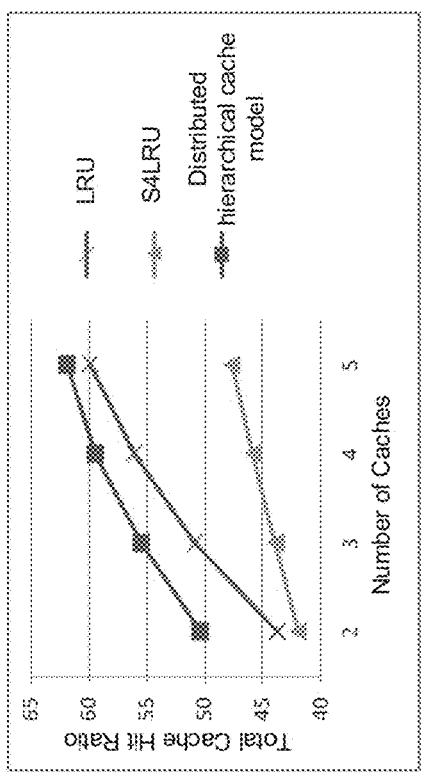
Figure 8C:
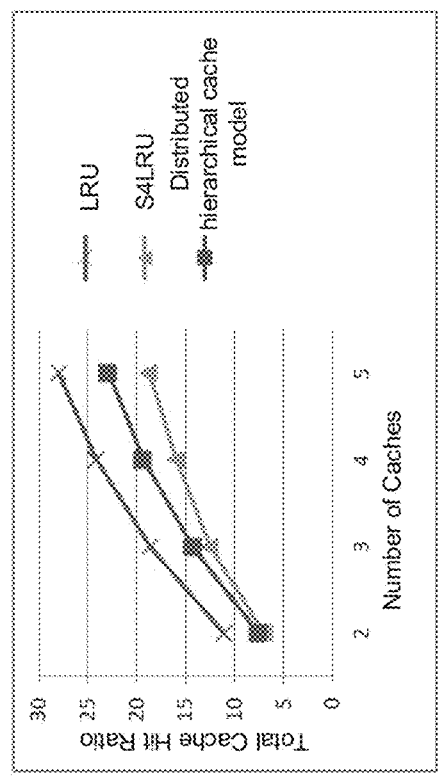

As shown in FIG. 8A, method 300 provides a higher simulated total cache hit ratio when compared to the LRU and S4LRU method using the same simulation parameters. In FIG. 8B, method 300 also achieves a higher simulated first level cache hit ratio than that of the LRU and S4LRU methods. For the LRU and S4LRU methods, a first-level cache hit means a content request is served by a physical cache closest to the requesting user, and a second-level cache hit means the a content request is serve by a physical cache which is not the closest physical cache. In FIG. 8C, method 300 provides a simulated second level cache hit ratio that is between that achieved by LRU and S4LRU. Finally in FIG. 8D, method 300 results in the lowest simulated inter-cache traffic ratio. Inter-cache traffic occurs when a user request a piece of data content which is not stored in the closest physical cache memory, and must be moved from another physical cache memory to the closest cache memory. Accordingly, inter-cache traffic ratio provides an indication of network bandwidth and backhaul traffic as understood by those skilled in the art. Through use of coordinated caching and retrieval as achieved through method 300 above, improved overall cache hit ratios, and level-1 cache hit ratios can be obtained while reducing inter-cache network bandwidth, when compared to LRU and S4LRU methods.

In certain embodiments, method 300 of FIG. 3A may be executed by a management module (such as a CCFM) communicatively coupled to the various cache memories of a cache memory network. Step 330 (performing cache management operations for the cache memory network using the distributed hierarchical cache model) may comprise various operations controlled by the management module, through the communication of different signals/messages between various cache memories. Alternatively, some operations may be initiated by individual cache memories, or executed between cache memories of the cache memory network. Some possible operations and their corresponding signals/messages are listed in Table 1 below. Some information in the signalling messages may be omitted. The physical address can be replaced by the virtual address, where some network functions such as network address translator can translate the virtual addresses to physical addresses.

nicate with other devices or networks (not shown) in determining forwarding, protocol, and other data delivery decisions to facilitate data transmission between nodes.

TABLE 1

| OPERATION | SIGNAL/MESSAGE |
|---|---|
| Messages from management module to cache memories | |
| Cache memory configuration (to configure cache memory size, cache level/segment information and size of each cache level) | Physical address of source cache, total cache size, cache levels, size of cache levels, name(s) of content service providers |
| Data content tagging | Physical address of source cache, cache level tag (indicating which cache level data content is mapped), popularity tag, Content Service Provider (CSP) name, content name, timers (indicates how long data content should be kept) |
| Data content replication | Action = replicate, content name, physical address of source cache, physical address of destination cache, content valid timers |
| Data content moving | Action = move, content name, physical address of source cache, physical address of destination cache |
| Data content delete | Action = delete, physical address of source cache, content name |
| Request cache statistics | Action = Memory usage reporting, physical address of source cache, CSP usage, data content requests and popularity |
| Messages from cache memories to the management module | |
| Report data content popularity | Action = Report cache hit/miss statistics, type = content hits, physical address of source cache, data content name, data content tag, start time of reporting period, end time of reporting period |
| Report cache memory usage | Physical address of source cache, Action = report memory usage of each cache level of CSP or data content name with associated popularity |
| Messages between cache memories | |
| Inter-cache memory content sharing (replicate or more data content between cache memories) | Physical address of source cache, physical address of destination cache address, action = replicate content to destination cache, CSP name, data content name, content tag, number of cache hits |
| Inter-cache memory content request | Physical address of requesting cache, CSP name, data content name |

Figure 9:
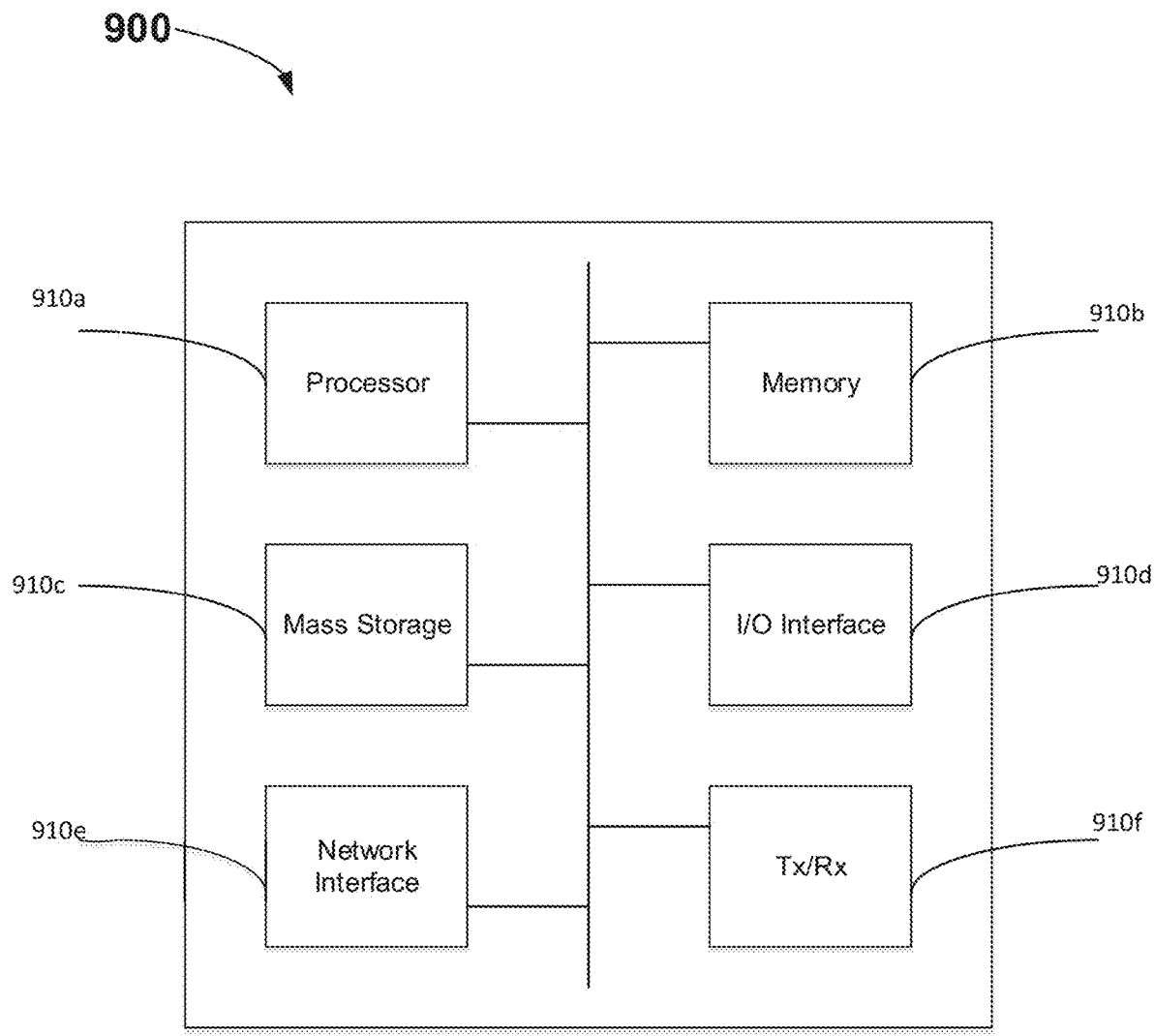
FIG. 9 illustrates a hardware module, according to an embodiment.

Referring to FIG. 9, there is shown a schematic diagram of a hardware module 900 which may be configured to execute and perform the various methods disclosed above. The management module, or CCFM, for example, may comprise hardware module 900 in certain embodiments. As shown, the hardware module 900 includes a processor 900a, memory 900b, non-transitory mass storage 900c, I/O interface 900d, network interface 900e, and a transceiver 900f, all of which are communicatively coupled via bi-directional bus. According to certain embodiments, any or all of the depicted elements may be utilized, or only a subset of the elements. Further, hardware module 900 may contain multiple instances of certain elements, such as multiple processors, memories, or transceivers. Also, elements of hardware module 900 may be directly coupled to other elements without the bi-directional bus.

The I/O interface 900d, and/or transceiver 900f may be implemented to receive requests from recipient nodes, receive indications and/or data from transmitting nodes, and transmit data to recipient nodes, according to different RAN configurations having wired or wireless links between nodes. The network interface 900e may be used to communicate with other devices or networks (not shown) in determining forwarding, protocol, and other data delivery decisions to facilitate data transmission between nodes.

The memory 900b may include any type of non-transitory memory such as static random access memory (SRAM), dynamic random access memory (DRAM), synchronous DRAM (SDRAM), read-only memory (ROM), any combination of such, or the like. The mass storage element 900c may include any type of non-transitory storage device, such as a solid state drive, hard disk drive, a magnetic disk drive, an optical disk drive, USB drive, or any computer program product configured to store data and machine executable program code. According to certain embodiments, the memory 900b or mass storage 900c may have recorded thereon statements and instructions executable by the processor 900a for performing the aforementioned functions and steps with the hardware module 900.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for managing a cache memory network according to a distributed hierarchical cache model comprising a plurality of cache levels, the method comprising:
   dividing at least one cache memory of the cache memory network into a plurality of cache segments;
   mapping each of the cache segments of each of the at least one cache memory to one of the plurality of cache levels of the distributed hierarchical cache model, each of the cache levels corresponding to a delivery rank associated with each of the cache segments, the delivery rank corresponding to each cache level being indicative of a delivery quality for delivering data content to users of the cache memory network; and
   performing cache management operations over the cache memory network according to the distributed hierarchical cache model.

2. The method of claim 1 wherein performing cache management operations comprises:
   assessing a piece of data content according to a cache management criteria;
   determining which one of the plurality of cache levels to assign to the piece of data content according to the assessment; and
   caching the piece of data content to one of the cache segments that is mapped to the determined cache level.

3. The method of claim 2 wherein the cache management criteria is one of: popularity, least recently used data content, quality of service, priority level, delivery speed, delay requirements, and contractual service level agreement criteria.

4. The method of claim 2 wherein the piece of data content is referenced from a user request, or retrieved from a content provider.

5. The method of claim 2 wherein the plurality of cache levels includes a first cache level and a second cache level, wherein the first cache level is mapped to the cache segments that are determined to be logically closer to users of the cache memory network, and the second cache level is mapped to cache segments that are determined to be logically further to users of the cache memory network, wherein caching comprises storing relatively popular data content in the cache segments that are mapped to the first cache level, and storing relatively less popular data content in the cache segments that are mapped to the second cache level.

6. The method of claim 1 wherein the delivery rank is selected from the list consisting of a delay constraint rank, quality of service rank, quality of experience rank, or a distance rank.

7. The method of claim 1 wherein the cache memory network comprises a plurality of cache memories and the method further comprises:
   mapping a cache memory of the plurality of cache memories of the cache memory network to one of plurality of cache levels of the distributed hierarchical cache model.

8. The method of claim 1 wherein performing cache management operations further comprises:
   determining if a requested piece of data content from a user is associated with the distributed hierarchical cache model; and when the requested piece of data content is associated with the distributed hierarchical cache model,
   determining which cache level of the plurality of cache levels of the distributed hierarchical cache model the requested piece of data content is associated with; and
   sending the requested piece of data content to the user from the cache segment that is mapped to the determined cache level the requested piece of data content is associated with.

9. The method of claim 8 wherein determining whether the requested piece of data content is associated with the distributed hierarchical cache model comprises comparing the requested piece of data content against a database comprising data content associated with the distributed hierarchical cache model.

10. The method of claim 8 wherein determining which cache level is associated with the requested piece of data content comprises comparing the requested piece of data content against a library for each cache level, the library for each respective cache level comprising data content associated with the respective cache level.

11. A management module for managing a cache memory network according to a distributed hierarchical cache model having a plurality of cache levels, the management module comprising:
    a processor; and
    a memory communicatively coupled to the processor and having stored thereon machine readable code which when executed by the processor causes the management module to:
        divide at least one cache memory of the cache memory network into a plurality of cache segments;
        map each of the cache segments of each of the at least one cache memory to one of the plurality of cache levels of the distributed hierarchical cache model, wherein each of the cache levels correspond to a delivery rank, the delivery rank corresponding to each cache level being indicative of a delivery quality for delivering data content to users of the cache memory network; and
        perform cache management operations over the cache memory network according to the distributed hierarchical cache model.

12. The management module of claim 11 wherein the cache management operations comprise:
    assessing a piece of data content according to a cache management criteria;
    determining which one of the plurality of cache levels to assign to the piece of data content according to the assessment; and caching the piece of data content to one of the cache segments that is mapped to the determined cache level.

13. The management module of claim 12 wherein the cache management criteria is one of: popularity, least recently used data content, quality of service, priority level, delivery speed, delay requirements, and contractual service level agreement criteria.

14. The management module of claim 12 wherein the piece of data content is referenced from a user request, or retrieved from a content provider.

15. The management module of claim 12 wherein the plurality of cache levels includes a first cache level and a second cache level, wherein the first cache level is mapped to the cache segments that are determined to be logically closer to users of the cache memory network, and the second cache level is mapped to cache segments that are determined to be logically further to users of the cache memory network, wherein the caching comprises storing relatively popular data content in the cache segments that are mapped to the first cache level, and storing relatively less popular data content in the cache segments that are mapped to the second cache level.

16. The management module of claim 11 wherein the delivery rank is selected from the list consisting of a delay constraint rank, quality of service rank, quality of experience rank, or a distance rank.

17. The management module of claim 11 wherein the delivery rank for each of the cache levels corresponds to a logical topology of cache segments mapped to each cache level in relation to a user of the cache memory network.

18. The management module of claim 11 wherein the cache management operations comprise:
determining if a requested piece of data content from a user is associated with the distributed hierarchical cache model; and when the requested piece of data content is associated with the distributed hierarchical cache model,
determining which cache level of the plurality of cache levels of the distributed hierarchical cache model the requested piece of data content is associated with; and
sending the requested piece of data content to the user from the cache segment that is mapped to the determined cache level the requested piece of data content is associated with.

19. The management module of claim 18 wherein determining whether the requested piece of data content is associated with the distributed hierarchical cache model comprises comparing the requested piece of data content against a database comprising data content associated with the distributed hierarchical cache model.

20. The management module of claim 18 wherein determining which cache level is associated with the requested piece of data content comprises comparing the requested piece of data content against a library for each cache level, the library for each respective cache level comprising data content associated with the respective cache level.

21. A cache memory network comprising:
a plurality of cache memories; and
a management module communicatively coupled to the plurality of cache memories, the management module operatively configured to:
divide at least one cache memory into a plurality of cache segments;
map each of the cache segments of each of the at least one cache memory to one of the plurality of cache levels of a distributed hierarchical cache model, wherein each of the cache levels correspond to a delivery rank the delivery rank corresponding to each cache level being indicative of a delivery quality for delivering data content to users of the cache memory network; and
perform cache management operations over the plurality of cache memories according to the distributed hierarchical cache model.

* * * * *